United States Patent
Chandra

(10) Patent No.: US 11,030,080 B2
(45) Date of Patent: Jun. 8, 2021

(54) SYSTEM FOR OPTIMIZATION OF DATA LOADING IN A SOFTWARE CODE DEVELOPMENT PLATFORM

(71) Applicant: BANK OF AMERICA CORPORATION, Charlotte, NC (US)

(72) Inventor: Basavaiah Chandra, Telangana (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 0 days.

(21) Appl. No.: 16/578,824

(22) Filed: Sep. 23, 2019

(65) Prior Publication Data

US 2021/0089431 A1 Mar. 25, 2021

(51) Int. Cl.
G06F 11/36 (2006.01)
G06F 11/30 (2006.01)
G06N 20/00 (2019.01)
G06K 9/62 (2006.01)

(52) U.S. Cl.
CPC ........ *G06F 11/3664* (2013.01); *G06F 11/302* (2013.01); *G06K 9/6256* (2013.01); *G06K 9/6267* (2013.01); *G06N 20/00* (2019.01)

(58) Field of Classification Search
CPC ... G06F 11/3664; G06F 11/302; G06N 20/00; G06K 9/6256; G06K 9/6267
See application file for complete search history.

(56) References Cited

U.S. PATENT DOCUMENTS

| | | | |
|---|---|---|---|
| 8,423,975 B1* | 4/2013 | Scallon | G06F 11/3457 717/135 |
| 8,768,894 B2 | 7/2014 | Stanley et al. | |
| 8,990,783 B1* | 3/2015 | Yu | G06F 9/4887 717/131 |
| 9,015,684 B1 | 4/2015 | Koh et al. | |
| 9,430,505 B2 | 8/2016 | Padmanabhan et al. | |
| 9,442,696 B1* | 9/2016 | Koh | G06F 30/20 |
| 9,519,695 B2 | 12/2016 | Sampathkumaran et al. | |
| 9,922,103 B2 | 3/2018 | Martens et al. | |
| 10,268,633 B2 | 4/2019 | Mohanty et al. | |
| 10,282,359 B1* | 5/2019 | Prendki | G06N 3/08 |
| 10,453,167 B1* | 10/2019 | Kawachiya | G06F 9/3881 |
| 2007/0027852 A1* | 2/2007 | Howard | G06F 3/0237 |
| 2014/0380289 A1* | 12/2014 | Kalogeropulos | G06F 8/4441 717/152 |
| 2016/0283863 A1* | 9/2016 | Bowers | G06N 20/00 |
| 2016/0314064 A1* | 10/2016 | Moretto | H04L 41/5035 |
| 2018/0253294 A1* | 9/2018 | Kelly | G06F 8/65 |
| 2018/0285246 A1* | 10/2018 | Tuttle | H04L 47/82 |

(Continued)

OTHER PUBLICATIONS

Zheng Wang et al., "Machine Learning in Compiler Optimisation", May 9, 2018 (Year: 2018).*

*Primary Examiner* — Douglas M Slachta
(74) *Attorney, Agent, or Firm* — Michael A. Springs; Moore & Van Allen PLLC; Nicholas C. Russell

(57) ABSTRACT

A system is typically configured for gathering one or more input parameters associated with data loading in a software application, simulating a production environment based on the one or more input parameters, executing a data loading code associated with the software application in the simulated production environment, and calculating a data loading time based at least on historical data and an output associated with executing the data loading code in the simulated production environment.

17 Claims, 6 Drawing Sheets

(56) References Cited

U.S. PATENT DOCUMENTS

| | | | |
|---|---|---|---|
| 2018/0314683 A1* | 11/2018 | Tan | G06F 16/3346 |
| 2018/0349795 A1* | 12/2018 | Boyle | G06F 16/24578 |
| 2020/0019493 A1* | 1/2020 | Ramakrishna | G06F 8/65 |
| 2020/0065214 A1* | 2/2020 | Negishi | G06F 11/3457 |
| 2020/0177478 A1* | 6/2020 | Dakshinyam | H04L 41/5096 |
| 2020/0311600 A1* | 10/2020 | Kulkarni | G06F 8/20 |
| 2020/0394462 A1* | 12/2020 | Hild | G06F 11/3409 |
| 2020/0410390 A1* | 12/2020 | Fu | G06F 11/3466 |
| 2021/0056007 A1* | 2/2021 | Viswanathan | G06F 8/71 |

* cited by examiner

SYSTEM FOR OPTIMIZATION OF DATA LOADING IN A SOFTWARE CODE DEVELOPMENT PLATFORM

BACKGROUND

Currently challenges arise when attempting to optimize data loading in a software code development platform. As such, there exists a need for a system to dynamically optimize data loading in a software code development platform.

BRIEF SUMMARY

Embodiments of the present invention address the above needs and/or achieve other advantages by providing apparatuses (e.g., a system, computer program product and/or other devices) and methods for optimizing data loading in a software code development platform. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system gather one or more input parameters associated with data loading in a software application, simulate a production environment using the one or more input parameters, execute a data loading code associated with the software application in the simulated production environment, and calculate a data loading time based at least on historical data and an output associated with executing the data loading code in the simulated production environment.

In some embodiments, the gathers the one or more input parameters based on prompting a user to provide the one or more input parameters and receiving the one or more input parameters from the user.

In some embodiments, the system gathers at least one of the one or more input parameters based on crawling into a production server and identifying the hardware parameters and software parameters associated with the production server.

In some embodiments, the system generates the data loading code based on the one or more input parameters, wherein the data loading code is compatible with a data load tool utilized in the production environment.

In some embodiments, the system generates the data loading code based on converting at least one parameter of the one or more input parameters into programmable code based on performing natural language processing.

In some embodiments, the system identifies that the data loading time is greater than a predetermined threshold, automatically optimizes, via a machine learning model, the data loading code, wherein the machine learning model is trained based on historical optimization data, and displays the optimized data loading code to a user.

In some embodiments, the system re-trains the machine learning model based on real-time data loading time.

In some embodiments, the system calculates the data loading time using classification algorithm.

In some embodiments, the system receives the data loading code from a user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
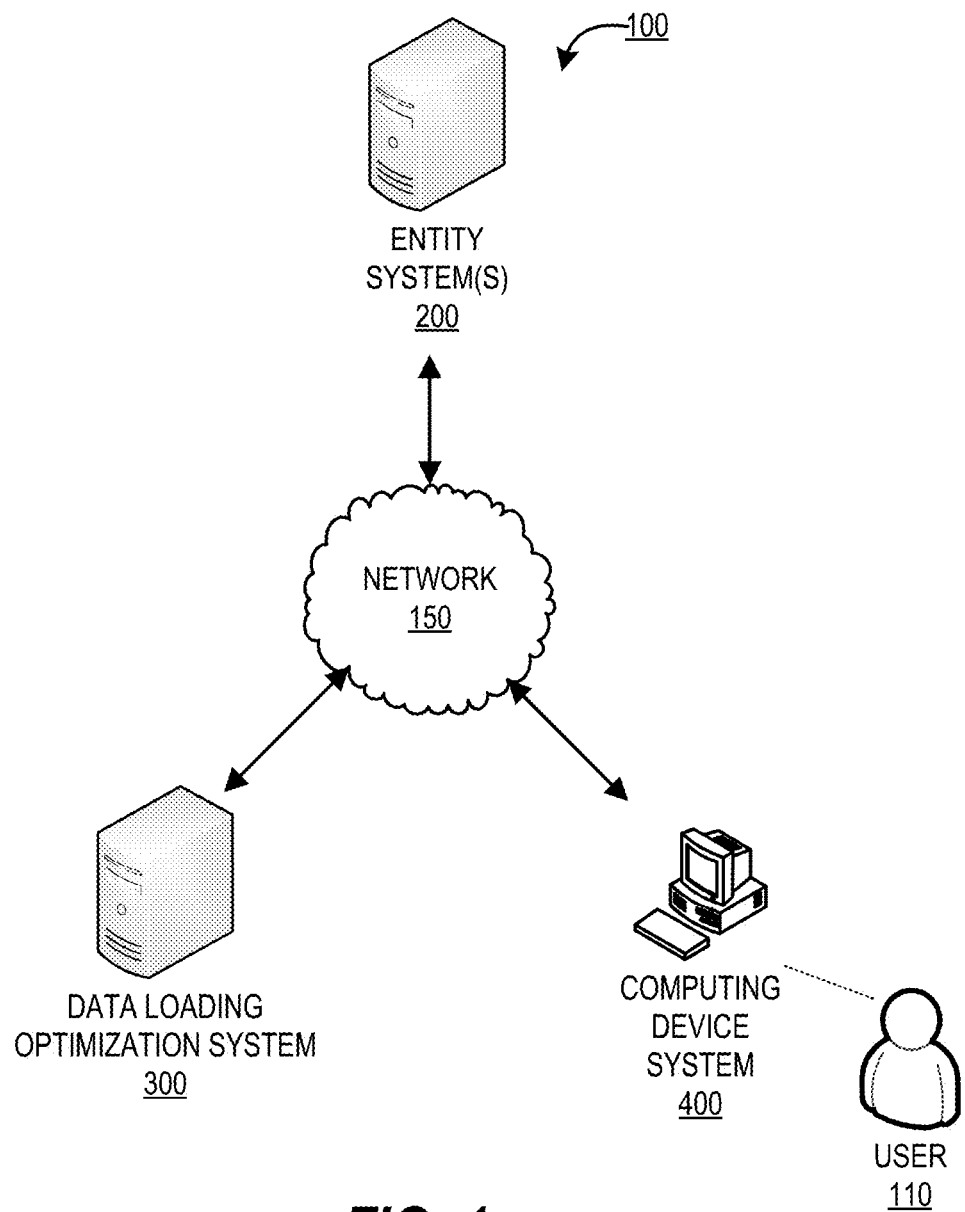
Figure 2:
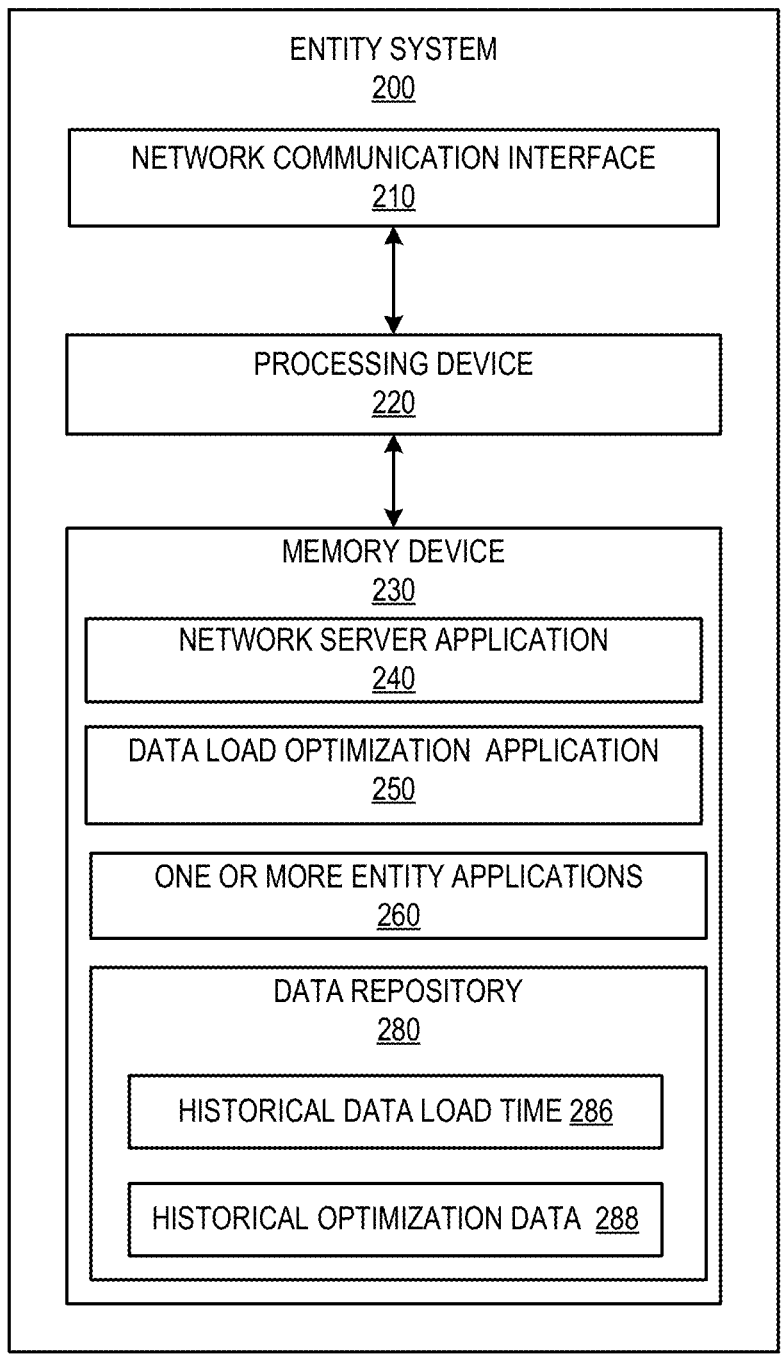
Figure 3:
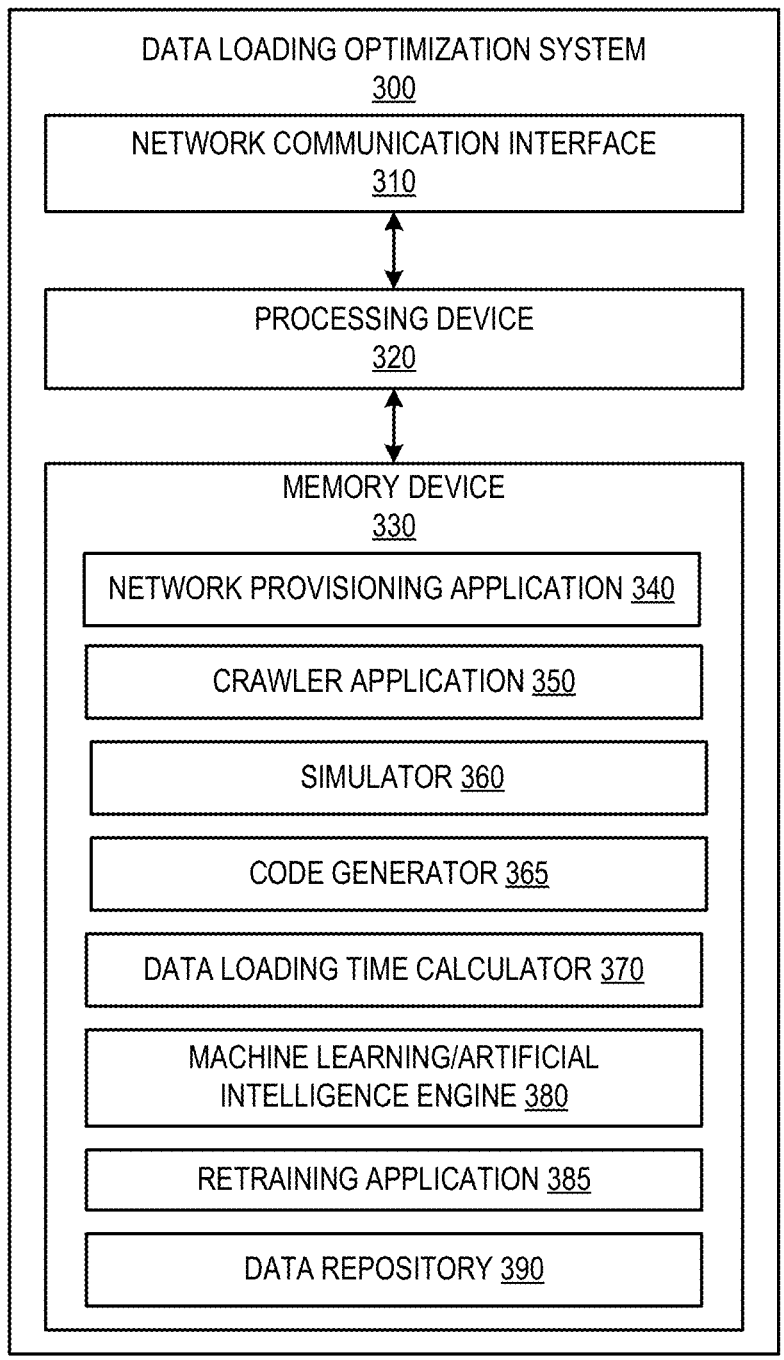
Figure 4:
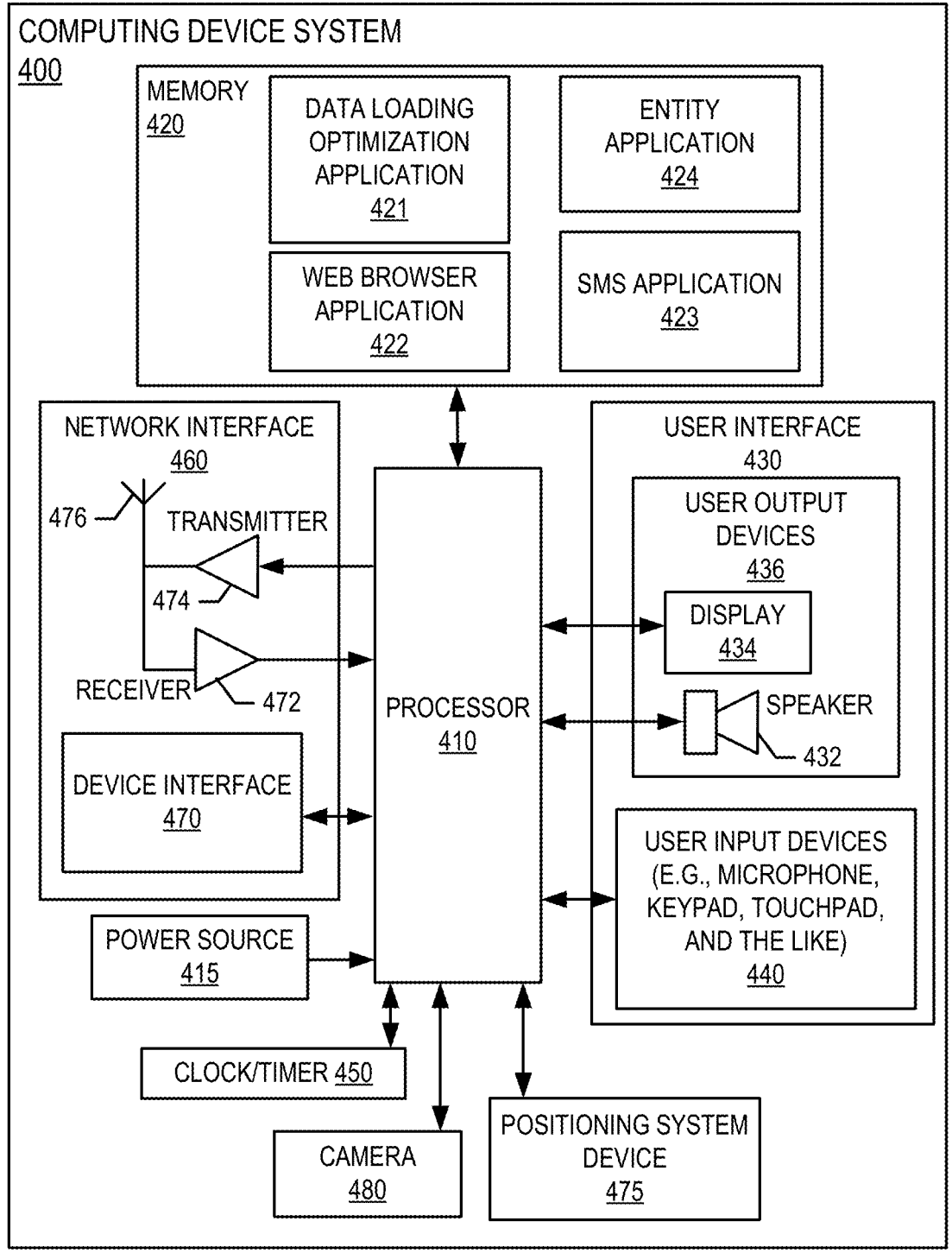
Figure 5:
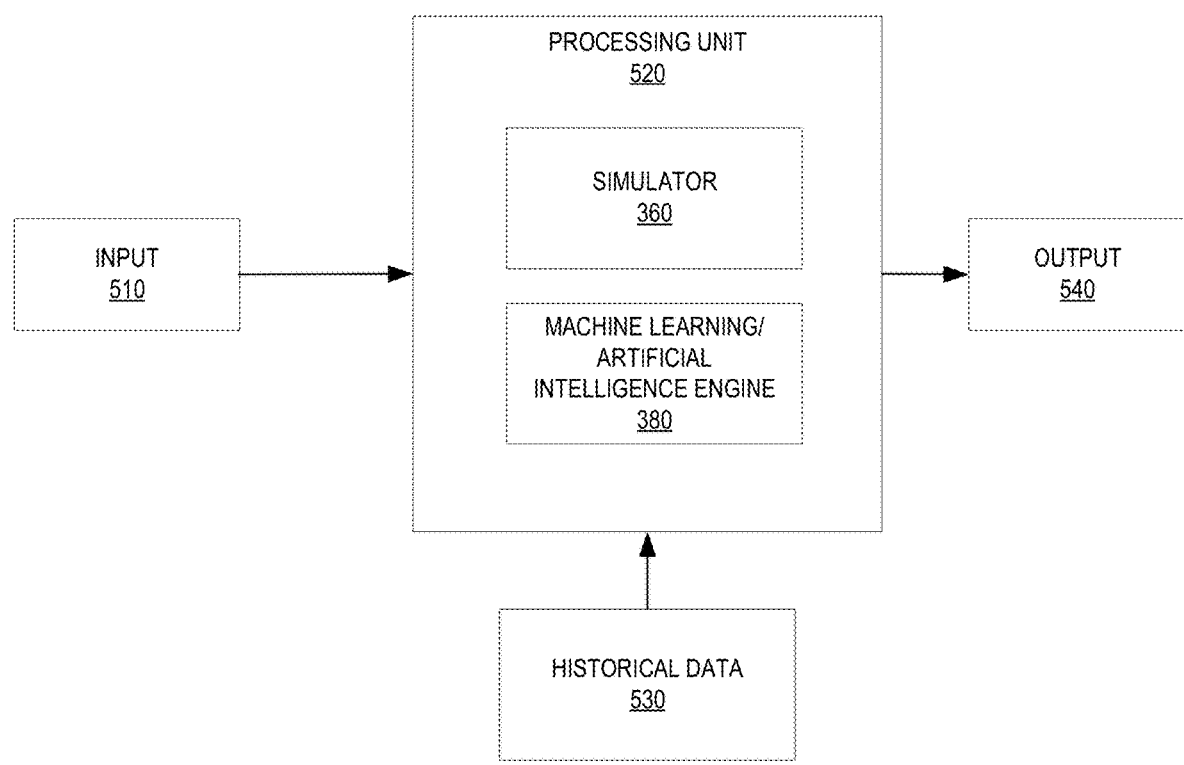
Figure 6:
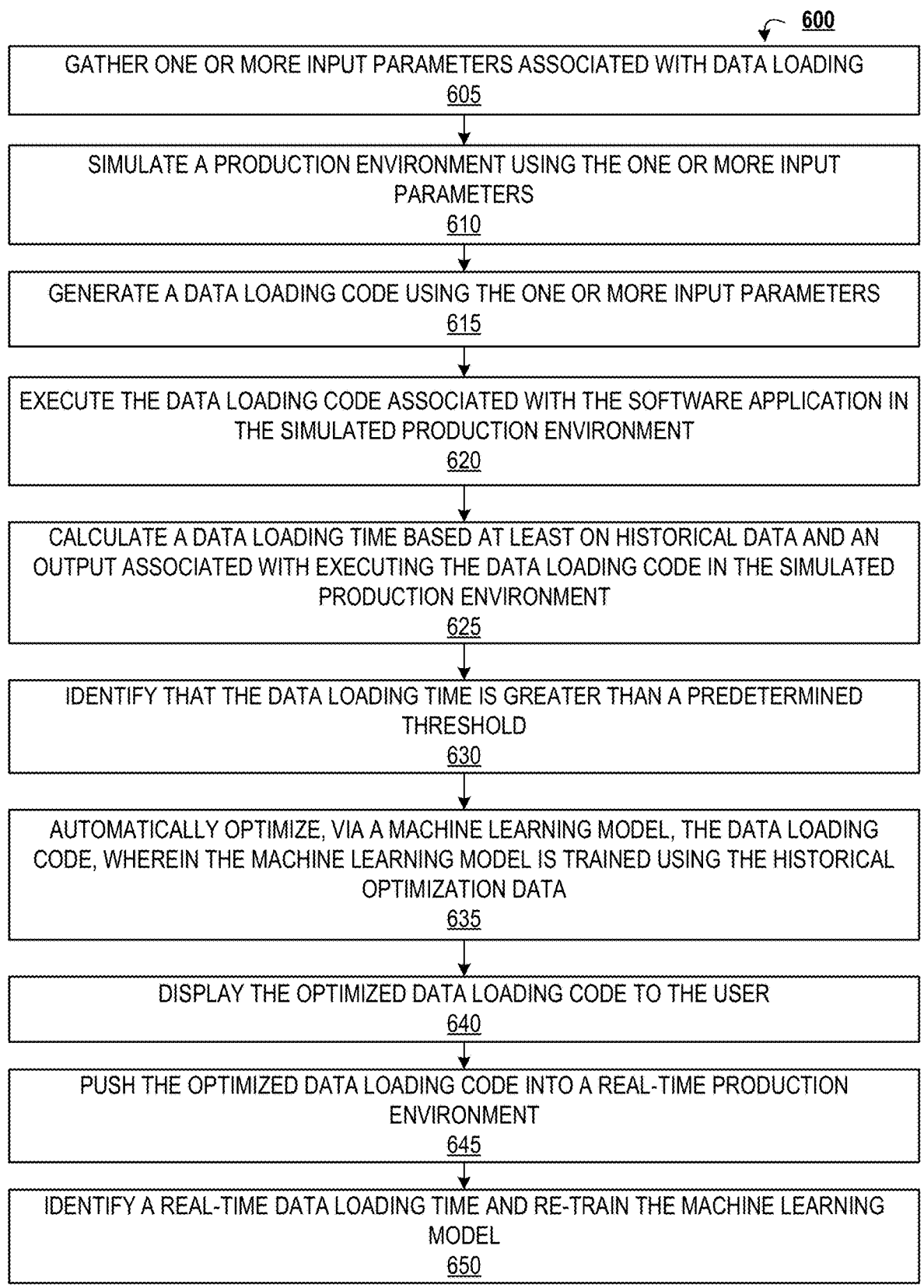

Having thus described embodiments of the invention in general terms, reference will now be made the accompanying drawings, wherein:

FIG. 1 provides a block diagram illustrating a system environment for optimizing data loading in a software code development platform, in accordance with an embodiment of the invention;

FIG. 2 provides a block diagram illustrating the entity system 200 of FIG. 1, in accordance with an embodiment of the invention;

FIG. 3 provides a block diagram illustrating a data loading optimization system 300 of FIG. 1, in accordance with an embodiment of the invention;

FIG. 4 provides a block diagram illustrating the computing device system 400 of FIG. 1, in accordance with an embodiment of the invention;

FIG. 5 provides a block diagram illustrating the process of optimizing data loading, in accordance with an embodiment of the invention; and FIG. 6 provides a flowchart illustrating a process flow for optimizing data loading, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the term "entity" may include any organization that develops software applications. Furthermore, embodiments of the present invention use the term "user." It will be appreciated by someone with ordinary skill in the art that the user may be an employee of the entity. In an embodiment of the present invention, the entity may be a financial institution and a user may be an employee (e.g., application developer) of the financial institution. In accordance with embodiments of the present invention, the term "software application" may be any application that is being developed and/or maintained by the entity.

Typically, developers develop a code in a development environment and move the code to a testing environment for testing. Once the code is tested and meets certain standards, the code is then moved to production environment where the functionalities presented by the code are visible to the end users. In some cases, the code is moved to a user acceptance testing environment to test the code further before moving the code to the production environment. Codes may be developed for loading data in various software applications and while developing a data loading code, the main challenge faced by developers is the data loading time associated with the data loading code. Data loading time is highly dynamic in nature and is dependent on various factors including, but not limited to, network latency, hardware configurations, tool behavior, number of components in the code, and the like. This makes it difficult to estimate the data loading time and conventional systems do not have the capability to estimate the data loading time. So, developers develop the data loading code without knowing the estimated data loading time associated with the data loading code that they developed, deploy it to next environment for testing, and finally deploy it to the production environment for the end users. The developers developing the code do not have any idea about the efficiency of the code they developed in terms of the data loading time until the code is deployed to the real-time production environment. In a case where the data loading time is not up to a predetermined standard, the code deployed to the production environment is reverted and a new code is created, deployed to the testing environment for testing, and is then deployed to the production environment. This process is typically repeated for 'n' iterations until the data loading time meets the predetermined standard. This process is also not efficient in terms of Software Development Life Cycle (SDLC) process. As such, there exists a need for a system to efficiently improve the data loading time. The system of the present invention solves the problem discussed above by automatically improving the data loading time without having to go through the iterative process.

FIG. 1 provides a block diagram illustrating a system environment 100 for optimizing data loading in a software code development platform, in accordance with an embodiment of the invention. As illustrated in FIG. 1, the environment 100 includes a data loading optimization system 300, entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees of an entity associated with the entity system 200.

The entity system(s) 200 may be any system owned or otherwise controlled by an entity to support or perform one or more process steps described herein. In some embodiments, the entity is a financial institution. In some embodiments, one of the entity system(s) 200 may be a production system, where the software applications are deployed to the end users (e.g., customers of the entity, other employees of the entity, and the like) of the applications in real-time.

The data loading optimization system 300 is a system of the present invention for performing one or more process steps described herein. In some embodiments, the data loading optimization system 300 may be an independent system. In some embodiments, the data loading optimization system 300 may be a part of the entity system 200.

The data loading optimization system 300, the entity system 200, and/or the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the data loading optimization system 300 is configured to communicate information or instructions with the entity system 200, and/or the computing device system 400 across the network 150.

The computing device system 400 may be a computing device of the user 110. In general, the computing device system 400 communicates with the user 110 via a user interface of the computing device system 400, and in turn is configured to communicate information or instructions with the data loading optimization system 300 and/or entity system 200 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In some embodiments, the entity system 200 may be operated by any entity that develops software applications. In certain embodiments, the entity system 200 is operated by a first entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a network server application 240, a data loading optimization application 250, one or more entity applications 260, and a data repository 280 comprising historical data load time 286 and historical optimization data 288. In some embodiments, the one or more entity applications 260 may include any data loading tools that are used by the entity for data loading. The computer-executable program code of the network server application 240, the data loading optimization application 250, and the one or more entity applications 260 to perform certain logic, data-extraction, and data-storing functions of the entity system 200 described herein, as well as communication functions of the entity system 200.

The network server application 240, the data loading optimization application 250 and the one or more entity applications 260 are configured to store data in the data repository 280 or to use the data stored in the data repository 280 when communicating through the network communication interface 210 with the data loading optimization system 300 and/or the computing device system 400 to perform one or more process steps described herein. In some embodiments, the entity system 200 may receive instructions from the data loading optimization system 300 via the data loading optimization application 250 to perform certain operations. The data loading optimization application 250 may be provided by the data loading optimization system 300.

FIG. 3 provides a block diagram illustrating the data loading optimization system 300 in greater detail, in accordance with embodiments of the invention. As illustrated in FIG. 3, in one embodiment of the invention, the data loading optimization system 300 includes one or more processing devices 320 operatively coupled to a network communication interface 310 and a memory device 330. In certain embodiments, the data loading optimization system 300 is operated by a first entity, such as a financial institution, while in other embodiments, the data loading optimization system 300 is operated by an entity other than a financial institution. In some embodiments, the data loading optimization system 300 is owned or operated by the entity of the entity system 200. In some embodiments, the data loading optimization system 300 may be an independent system. In alternate embodiments, the data loading optimization system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the data loading optimization system 300 described herein. For example, in one embodiment of the data loading optimization system 300, the memory device 330 includes, but is not limited to, a network provisioning application 340, a crawler application 350, a simulator 360, a code generator 365, data loading time calculator 370, machine learning/artificial intelligence engine 380, a retraining application 385, and a data repository 390 comprising data processed or accessed by one or more applications in the memory device 330. The computer-executable program code of the network provisioning application 340, the crawler application 350, the simulator 360, the code generator 365, data loading time calculator 370, the machine learning/artificial intelligence engine 380, and the retraining application 385 may instruct the processing device 320 to perform certain logic, data-processing, and data-storing functions of the data loading optimization system 300 described herein, as well as communication functions of the data loading optimization system 300.

The network provisioning application 340, the crawler application 350, the simulator 360, the code generator 365, data loading time calculator 370, the machine learning/artificial intelligence engine 380, and the retraining application 385 are configured to invoke or use the data in the data repository 390 when communicating through the network communication interface 310 with the entity system 200, the computing device system 400, and/or the resource entity systems 201. In some embodiments, the network provisioning application 340, the crawler application 350, the simulator 360, the code generator 365, data loading time calculator 370, the machine learning/artificial intelligence engine 380, and the retraining application 385 may store the data extracted or received from the entity system 200 and the computing device system 400 in the data repository 390. In some embodiments, the network provisioning application 340, the crawler application 350, the simulator 360, the code generator 365, data loading time calculator 370, the machine learning/artificial intelligence engine 380, and the retraining application 385 may be a part of a single application. One or more processes performed by the network provisioning application 340, the crawler application 350, the simulator 360, the code generator 365, data loading time calculator 370, the machine learning/artificial intelligence engine 380, and the retraining application 385 are described in FIG. 5 and FIG. 6.

FIG. 4 provides a block diagram illustrating a computing device system 400 of FIG. 1 in more detail, in accordance with embodiments of the invention. However, it should be understood that the computing device system 400 is merely illustrative of one type of computing device system that may benefit from, employ, or otherwise be involved with embodiments of the present invention and, therefore, should not be taken to limit the scope of embodiments of the present invention. The computing devices may include any one of portable digital assistants (PDAs), pagers, mobile televisions, mobile phone, gaming devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110 may include any of a number of devices allowing the computing device system 400 to receive data from the user 110, such as a keypad, keyboard, touch-screen, touch-pad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a data loading optimization application 421, an entity application 424, or the like. These applications also typically instructions to a graphical user interface (GUI) on the display 430 that allows the user 110 to interact with the entity system 200, the data loading optimization system 300, and/or other devices or systems. The memory 420 of the computing device system 400 may comprise a Short Message Service (SMS) application 423 configured to send, receive, and store data, information, communications, alerts, and the like via the wireless telephone network 152.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a block diagram 500 illustrating the process of optimizing data loading, in accordance with an embodiment of the invention. As shown, the system of the invention takes inputs 510 and processes the inputs 510 in the processing unit 520 using historical data 530. The inputs 510 may include, but are not limited to, source datacenter information, tool data center information, target data center information, production environment information (hardware information such as processing speed, CPU information, memory information, input devices, output devices, network connections, and the like), data transformation rules, data volume, source type, target type, or the like. The processing unit 520 of the system processes the inputs 510 via the simulator 360 and the machine learning/artificial intelligence engine 380 and produces at least one output 540. The output 540 may be data loading time, data loading code, or optimized data loading code.

FIG. 6 provides a process flow 600 for optimizing data loading, in accordance with an embodiment of the invention. As shown in block 605, the system gathers one or more input parameters associated with data loading in a software application. The one or more input parameters may include, but are not limited to, source datacenter information, tool data center information, target data center information, production environment information (hardware information such as processing speed, CPU information, memory information, input devices, output devices, network connections, and the like), data transformation rules, data volume, source type, target type, or the like. In some embodiments, the system may automatically gather at least some parameters of the one or more input parameters. For example, the system may automatically crawl into the entity network and identify the hardware configuration information and/or software configuration information of the production environment server. In some embodiments, the system may receive the one or more input parameters from a user when prompted by the system. In some embodiments, the user may access a graphical user interface provided by the system to initiate the process flow 600. In some embodiments, the user may access the graphical user interface to test the data loading time of a data loading code developed by the user. In some embodiments, the user may access the graphical user interface to cause the system to generate a data loading code. In some embodiments, the user may access the graphical user interface to optimize a data loading code. In some embodiments, the user may access the graphical user interface to cause the system to optimize a data loading code.

As shown in block 610, the system simulates a production environment using the one or more input parameters. The system may utilize the production environment information to simulate a production like environment.

As shown in block 615, the system generates a data loading code using the one or more input parameters. In some embodiments, the system may generate the data loading code by converting the data transformation rules into programmable code using Natural Language Processing (NLP). In some embodiments, the system may generate the data loading code based on historical data loading codes developed by users. In some embodiments, the system may receive the data loading code from a user.

As shown in block 620, the system executes the data loading code associated with the software application in the simulated production environment. As shown in block 625, the system calculates a data loading time based at least on historical data and an output associated with executing the data loading code in the simulated production environment. The system considers the real-time production hardware components as well the historical data to calculate or predict the data loading time. In some embodiments, the system may calculate the data loading time using a classification algorithm. In some embodiments, the system may calculate the data loading time, via the machine learning/artificial intelligence engine.

As shown in block 630, the system identifies that the data loading time is greater than a predetermined threshold. As shown in block 635, the system automatically optimizes, via a machine learning model, the data loading code, wherein the machine learning model is trained using the historical optimization data. The machine learning model may utilize historical optimization data to optimize the data loading code. For example, the system trains the machine learning model using the historical optimization data (e.g., actions taken by users to optimize the data loading codes) and the machine learning model optimizes the data loading code based on the training data provided by the system.

As shown in block 640, the system displays the optimized data loading code to the user. As shown in block 645, the system pushes the optimized data loading code into a real-time production environment. The system may push the optimized data loading code into the real-time production environment after receiving an approval from the user. The optimized data loading code developed by the system is compatible with different type of data loading tools utilized in the production environment system. The system may develop the code based on the input parameters which may include the type of the data loading tool. For example, the input parameters may specify that the data loading tool being used in the production environment system is tool 'A'. The system may then generate the code based on the coding standards associated with tool 'A'.

As shown in block 650, the system identifies a real-time data loading time and re-train the machine learning model. The system may identify the real-time data loading time after deploying the data loading code to the real-time production environment and may utilize the real-time data loading time to retrain the machine learning model.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for optimization of data loading in a software code development platform, comprising:
   at least one processing device;
   at least one memory device; and
   a module stored in the at least one memory device comprising executable instructions that when executed by the at least one processing device, cause the at least one processing device to:
   gather one or more input parameters associated with data loading in a software application;
   simulate a production environment based on the one or more input parameters for executing the software application, wherein the production environment is a replica of a real-time production server;
   execute a data loading code associated with the software application in the simulated production environment;
   calculate a data loading time based at least on historical data and an output associated with executing the data loading code in the simulated production environment;
   identify that the data loading time is greater than a predetermined threshold;
   automatically optimize, via a machine learning model, the data loading code, wherein the machine learning model is trained based on historical optimization data; and
   display the optimized data loading code to a user.

2. The system according to claim 1, wherein the executable instructions cause the at least one processing device to gather the one or more input parameters based on:
   prompting user to provide the one or more input parameters; and
   receiving the one or more input parameters from the user.

3. The system according to claim 1, wherein the executable instructions cause the at least one processing device to gather at least one of the one or more input parameters based on crawling into the real-time production server and identifying hardware parameters and software parameters associated with the real-time production server.

4. The system according to claim 1, wherein the executable instructions cause the at least one processing device to generate the data loading code based on the one or more input parameters, wherein the data loading code is compatible with a data load tool utilized in the production environment.

5. The system according to claim 4, wherein the executable instructions cause the at least one processing device to generate the data loading code based on converting at least one parameter of the one or more input parameters into programmable code based on performing natural language processing.

6. The system according to claim 1, wherein the executable instructions cause the at least one processing device to re-train the machine learning model based on real-time data loading time.

7. The system according to claim 1, wherein the executable instructions cause the at least one processing device to calculate the data loading time using classification algorithm.

8. The system according to claim 1, wherein the executable instructions cause the at least one processing device to receive the data loading code from the user.

9. A computer program product for optimization of data loading in a software code development platform, comprising a non-transitory computer-readable storage medium having computer-executable instructions for:
   gathering one or more input parameters associated with data loading in a software application;
   simulating a production environment based on the one or more input parameters for executing the software application, wherein the production environment is a replica of a real-time production server;
   executing a data loading code associated with the software application in the simulated production environment;
   calculating a data loading time based at least on historical data and an output associated with executing the data loading code in the simulated production environment;
   identifying that the data loading time is greater than a predetermined threshold;
   automatically optimizing, via a machine learning model, the data loading code, wherein the machine learning model is trained based on historical optimization data; and
   displaying the optimized data loading code to a user.

10. The computer program product according to claim 9, wherein the non-transitory computer-readable storage medium comprises computer-executable instructions for gathering at least one of the one or more input parameters based on crawling into the real-time production server and identifying hardware parameters and software parameters associated with the real-time production server.

11. The computer program product according to claim 10, wherein the non-transitory computer-readable storage medium comprises computer-executable instructions for generating the data loading code based on the one or more input parameters, wherein the data loading code is compatible with a data load tool utilized in the production environment.

12. The computer program product according to claim 11, wherein the non-transitory computer-readable storage medium comprises computer-executable instructions for re-training the machine learning model based on real-time data loading time.

13. A computer implemented method for optimization of data loading in a software code development platform, comprising:

gathering one or more input parameters associated with data loading in a software application;

simulating a production environment based on the one or more input parameters for executing the software application, wherein the production environment is a replica of a real-time production server;

executing a data loading code associated with the software application in the simulated production environment;

calculating a data loading time based at least on historical data and an output associated with executing the data loading code in the simulated production environment identifying that the data loading time is greater than a predetermined threshold;

automatically optimizing, via a machine learning model, the data loading code, wherein the machine learning model is trained based on historical optimization data; and displaying the optimized data loading code to a user.

14. The computer implemented method according to claim 13, wherein the method for gathering at least one of the one or more input parameters comprises crawling into the real-time production server and identifying the hardware parameters and software parameters associated with the real-time production server.

15. The computer implemented method according to claim 13, wherein the method further comprises generating the data loading code based on the one or more input parameters, wherein the data loading code is compatible with a data load tool utilized in the production environment.

16. The computer implemented method according to claim 13, wherein the method further comprises re-training the machine learning model based on real-time data loading time.

17. The computer implemented method according to claim 13, wherein the method comprises receiving the data loading code from the user.

* * * * *